(12) United States Patent
Plotnikov et al.

(10) Patent No.: US 9,122,475 B2
(45) Date of Patent: Sep. 1, 2015

(54) INSTRUCTION FOR SHIFTING BITS LEFT WITH PULLING ONES INTO LESS SIGNIFICANT BITS

(71) Applicants: Mikhail Plotnikov, Nizhny Novgorod (RU); Igor Ermolaev, Nizhny Novgorod (RU); Andrey Naraikin, Nizhny Novgorod (RU); Robert Valentine, Kiryat Tivon (IL)

(72) Inventors: Mikhail Plotnikov, Nizhny Novgorod (RU); Igor Ermolaev, Nizhny Novgorod (RU); Andrey Naraikin, Nizhny Novgorod (RU); Robert Valentine, Kiryat Tivon (IL)

(73) Assignee: Intel Corporation, Santa Clara, CA (US)

( * ) Notice: Subject to any disclaimer, the term of this patent is extended or adjusted under 35 U.S.C. 154(b) by 512 days.

(21) Appl. No.: 13/630,131

(22) Filed: Sep. 28, 2012

(65) Prior Publication Data

US 2014/0095830 A1 Apr. 3, 2014

(51) Int. Cl.
*G06F 9/30* (2006.01)
*G06F 15/80* (2006.01)

(52) U.S. Cl.
CPC ........ *G06F 9/30032* (2013.01); *G06F 9/30018* (2013.01); *G06F 9/30036* (2013.01)

(58) Field of Classification Search
None
See application file for complete search history.

(56) References Cited

U.S. PATENT DOCUMENTS

2010/0284404 A1\* 11/2010 Gopinath et al. ............. 370/392

\* cited by examiner

*Primary Examiner* — Scott Sun
(74) *Attorney, Agent, or Firm* — Nicholson De Vos Webster & Elliott LLP

(57) ABSTRACT

A mask generating instruction is executed by a processor to improve efficiency of vector operations on an array of data elements. The processor includes vector registers, one of which stores data elements of an array. The processor further includes execution circuitry to receive a mask generating instruction that specifies at least a first operand and a second operand. Responsive to the mask generating instruction, the execution circuitry is to shift bits of the first operand to the left by a number of times defined in the second operand, and pull in a bit of one from the right each time a most significant bit of the first operand is shifted out from the left to generate a result. Each bit in the result corresponds to one of the data elements of the array.

20 Claims, 13 Drawing Sheets

KSHLONES[B/W/D/Q] k1, r2    ; destination, SRC1

KL ← 8, 16, 32, 64
N = min(KL, SRC1)           ; number of mask bits (based on mnemonic)
for (i=0; i<N; i++){
    k1<<1+1
}

FIG. 2A

SHLONES[B/W/D/Q] r1, r2    ; destination, SRC1

KL ← 8, 16, 32, 64
N = min(KL, SRC1)          ; number of mask bits (based on mnemonic)
for (i=0; i<N; i++){
    r1<<1+1
}

FIG. 2B

KSHLONES[B/W/D/Q] k1, r2   ; destination, SRC1

KL ← 8, 16, 32, 64
N = min(KL, SRC1)          ; number of mask bits (based on mnemonic)
for (i=0; i<N; i++){
    k1<<1+1
}
if (N==0) ZF = 1
if (N==KL) CF = 1

FIG. 2C

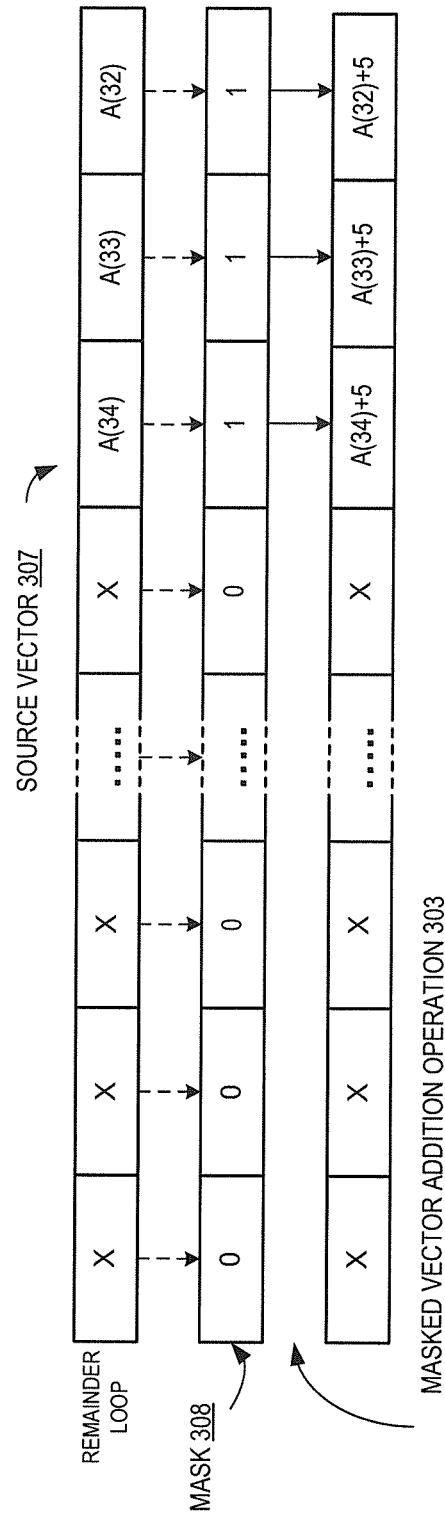

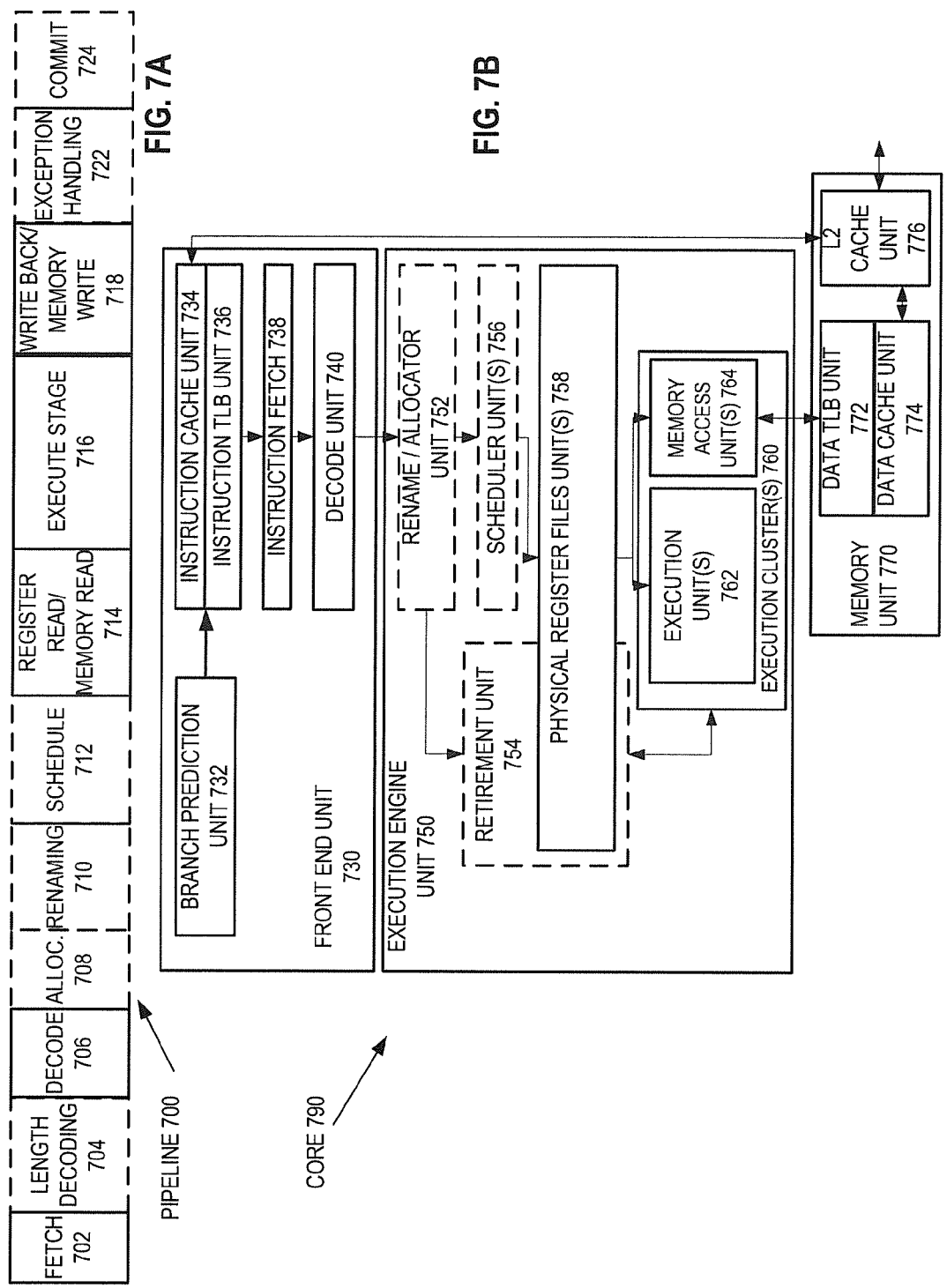

INSTRUCTION FOR SHIFTING BITS LEFT WITH PULLING ONES INTO LESS SIGNIFICANT BITS

TECHNICAL FIELD

The present disclosure pertains to the field of processing logic, microprocessors, and associated instruction set architecture that, when executed by the processor or other processing logic, perform logical, mathematical, or other functional operations.

BACKGROUND ART

An instruction set, or instruction set architecture (ISA), is the part of the computer architecture related to programming, and may include the native data types, instructions, register architecture, addressing modes, memory architecture, interrupt and exception handling, and external input and output (I/O). The term instruction generally refers herein to macro-instructions—that is instructions that are provided to the processor (or instruction converter that translates (e.g., using static binary translation, dynamic binary translation including dynamic compilation), morphs, emulates, or otherwise converts an instruction to one or more other instructions to be processed by the processor) for execution—as opposed to micro-instructions or micro-operations (micro-ops)—that is the result of a processor's decoder decoding macro-instructions.

The ISA is distinguished from the micro-architecture, which is the internal design of the processor implementing the instruction set. Processors with different micro-architectures can share a common instruction set. For example, Intel® Core™ processors and processors from Advanced Micro Devices, Inc. of Sunnyvale Calif. implement nearly identical versions of the x86 instruction set (with some extensions that have been added with newer versions), but have different internal designs. For example, the same register architecture of the ISA may be implemented in different ways in different micro-architectures using well-known techniques, including dedicated physical registers, one or more dynamically allocated physical registers using a register renaming mechanism, etc.

Many modern ISAs support vector operations, also referred to as packed data operations or Single Instruction, Multiple Data (SIMD) operations. Instead of a scalar instruction operating on only one data element or pair of data elements, a vector instruction (also referred to as packed data instruction or SIMD instruction) may operate on multiple data elements or multiple pairs of data elements simultaneously or in parallel. The processor may have parallel execution hardware responsive to the vector instruction to perform the multiple operations simultaneously or in parallel.

A vector operation operates on multiple data elements packed within one register or memory location in one operation. These data elements are referred to as vector data element or packed data elements. Each of the vector data elements may represent a separate individual piece of data (e.g., a color of a pixel, etc.) that may be operated upon separately or independently of the others.

BRIEF DESCRIPTION OF THE DRAWINGS

Embodiments are illustrated by way of example and not limitation in the Figures of the accompanying drawings:

FIGS. 2A-2C illustrate examples of mask generating instructions according to one embodiment.

FIGS. 3A and 3B illustrate examples of array data alignments according to one embodiment.

FIG. 3C illustrates an example of a masked vector instruction that uses a mask according to one embodiment.

FIG. 7A is a block diagram of an in-order and out-of-order pipeline according to one embodiment.

FIG. 7B is a block diagram of an in-order and out-of-order core according to one embodiment.

DESCRIPTION OF THE EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description.

Embodiments described herein provide mask generating instructions operable to cause or result in a processor generating a mask to be used by masked vector instructions. The masked vector instructions can be applied to a scenario where the trip-count (i.e., the number of iterations) of a computational loop is not divisible by the number of elements that can fit into a vector register. Thus, the remainder iterations need to be handled separately. To process the elements in the remainder iterations, a mask generating instruction generates an appropriate predicate mask, which omits or masks off a portion of (e.g., the most significant elements) of a vector register from computations so that no exceptions would be produced (e.g., exceptions caused by access behind allocated memory or/and undefined results).

The mask generating instruction can also be used in other scenarios. For example, the instruction can be used to update a control mask in data accumulation for sparse vector computations. The data accumulation may be performed over multiple iterations. In some of the iterations, some data elements may exit the computation and some new data elements may join the computation. The control mask is updated to keep track the elements that require further computation. The control mask can be utilized in mask vector instructions to improve the efficiency of vector computation.

Similar to vector instructions, a masked vector instruction is operable to cause or result in a processor performing a vector operation on data elements of one or more vector operands. In addition, each masked vector instruction uses a mask to mask, predicate, or conditionally control the vector operation. The masks are operable to mask or conditionally control vector processing at per-data element granularity. For example, the masks may be operable to mask whether or not a result of a vector operation, performed on individual data elements from a single source vector operand or individual pairs of corresponding data elements from two source vector operands, is to be stored in a destination. The masked vector instructions allow vector processing of each data element or pair of corresponding data elements to be predicated or conditionally controlled separately and independently of the data elements. The masked vector instructions, operations, and masks may offer certain advantages, such as, for example, increased code density and/or higher instruction throughput.

Figure 1:
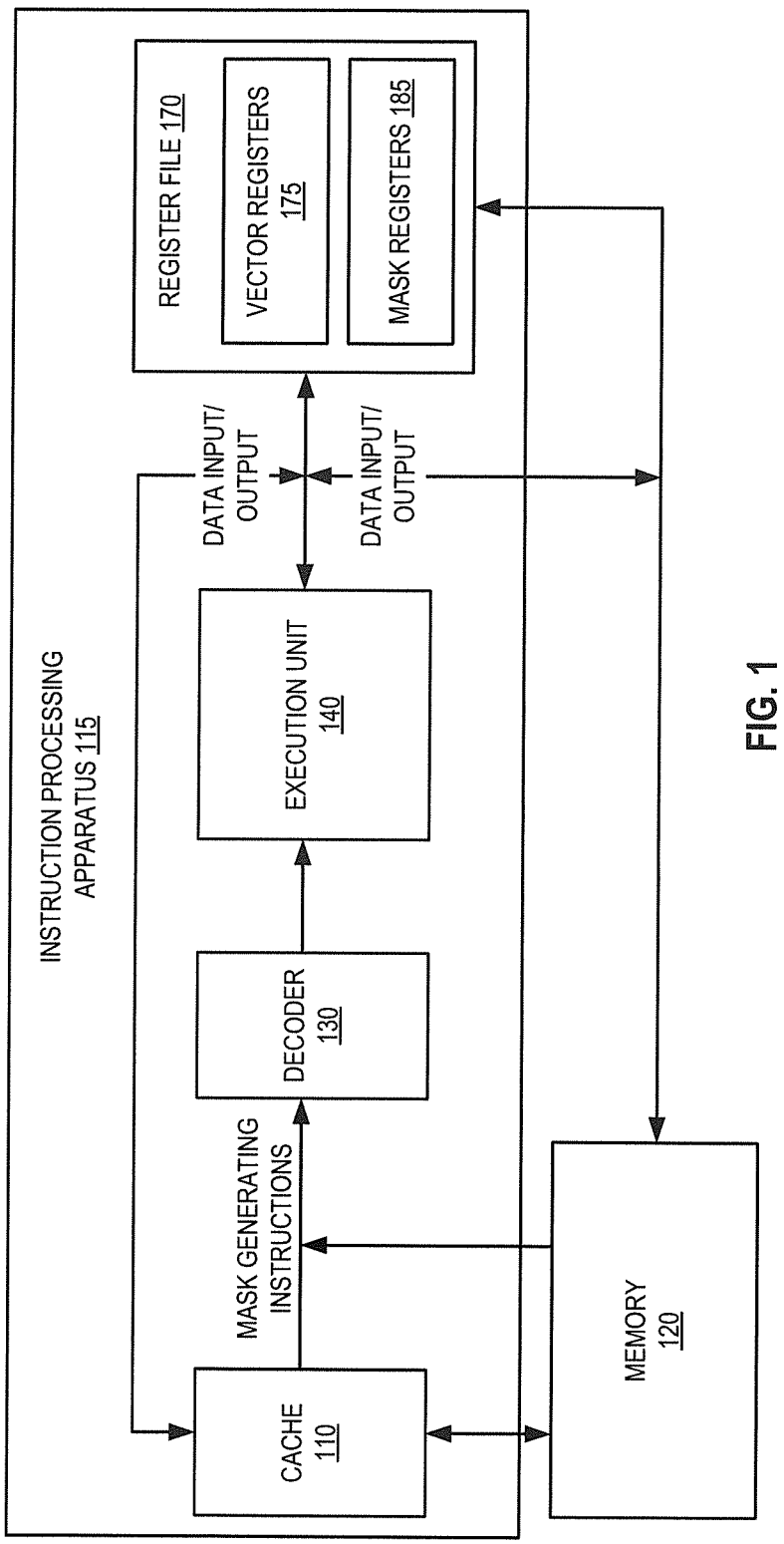
FIG. 1 is a block diagram of an instruction processing apparatus including vector registers and mask registers according to one embodiment.

FIG. 1 is a block diagram of an embodiment of an instruction processing apparatus 115 having an execution unit 140 that includes circuitry operable to execute instructions, including the mask generating instructions described herein. In some embodiments, the instruction processing apparatus 115 may be a processor, a processor core of a multi-core processor, or a processing element in an electronic system.

A decoder 130 receives incoming instructions in the form of higher-level machine instructions or macroinstructions, and decodes them to generate lower-level micro-operations, micro-code entry points, microinstructions, or other lower-level instructions or control signals, which reflect and/or are derived from the original higher-level instruction. The lower-level instructions or control signals may implement the operation of the higher-level instruction through lower-level (e.g., circuit-level or hardware-level) operations. The decoder 130 may be implemented using various different mechanisms. Examples of suitable mechanisms include, but are not limited to, microcode, look-up tables, hardware implementations, programmable logic arrays (PLAs), other mechanisms used to implement decoders known in the art, etc.

The decoder 130 may receive incoming instructions for a cache 110, a memory 120 or other sources. The decoded instructions are sent to the execution unit 140. The execution unit 140 may receive from the decoder 130 one or more micro-operations, micro-code entry points, microinstructions, other instructions, or other control signals, which reflect, or are derived from the received instructions. The execution unit 140 receives data input from and generates data output to a register file 170, the cache 110, and/or the memory 120.

In one embodiment, the register file 170 includes architectural registers, which are also referred to as registers. Unless otherwise specified or clearly apparent, the phrases architectural registers, register file, and registers are used herein to refer to registers that are visible to the software and/or programmer (e.g., software-visible) and/or the registers that are specified by macroinstructions to identify operands. These registers are contrasted to other non-architectural registers in a given microarchitecture (e.g., temporary registers, reorder buffers, retirement registers, etc.).

Alternatively, rather than having the decoder 130, in one or more other embodiments, the instruction processing apparatus 115 may instead have an instruction emulator, translator, morpher, interpreter, or other instruction conversion logic. Various different types of instruction conversion logic are known in the arts and may be implemented in software, hardware, firmware, or a combination thereof. The instruction conversion logic may receive one or more of the mask generating instructions, emulate, translate, morph, interpret, or otherwise convert it into one or more corresponding derived instructions or control signals. In still other embodiments, the instruction processing apparatus 115 may have both a decoder and additional instruction conversion logic. For example, the instruction processing apparatus 115 may have instruction conversion logic to convert one or more of the mask generating instructions into one or more intermediate instructions, and a decoder to decode the one or more intermediate instructions into one or more lower-level instructions or control signals executable by native hardware of the instruction processing apparatus. Some or all of the instruction conversion logic may be located off-die from the rest of the instruction processing apparatus, such as on a separate die or in an off-die memory.

According to one embodiment, the register file 170 includes a set of vector registers 175 and a set of mask registers 185, both of which can be used to store the operands of the mask generating instructions. Each vector register 175 can be 512 bits, 256 bits, or 128 bits wide, or a different vector width may be used. Each mask register 185 contains a number of mask bits, with each mask bit corresponding to one data element of one of the vector registers 175. As each mask bit is used to mask a data element of a vector register, a mask register of 64 bits can be used to mask sixty-four 8-bit data elements of a 512-bit register. For a vector register with a different width (e.g., 256 bits or 128 bits) and data elements of a different size (e.g., 16 bits, 32 bits or 64 bits), a different number of mask bits may be used in connection with a vector operation.

To avoid obscuring the description, a relatively simple instruction processing apparatus 115 has been shown and described. It is to be appreciated that other embodiments may have more than one execution unit. For example, the apparatus 115 may include multiple different types of execution units, such as, for example, arithmetic units, arithmetic logic units (ALUs), integer units, floating point units, etc. Still other embodiments of instruction processing apparatus or processors may have multiple cores, logical processors, or execution engines. A number of embodiments of the instruction processing apparatus 115 will be provided later with respect to FIGS. 7-13.

According to embodiments of the invention, the mask generating instruction described herein generates a mask by shifting the bits in a register operand of the instruction. The register operand may be a mask register or a general purpose register. FIGS. 2A-2C illustrates examples of pseudo-code for the mask generating instructions. In these figures, r1, r2 represent general purpose registers of independent sizes (e.g., r1 can be 32-bit, while r2 is 64-bit) and k1 represents a mask register. The value KL represents the number of mask bits, which can be determined from the mnemonic B/W/D/Q appended to the end of the instruction.

FIG. 2A illustrates an example of a mask generating instruction KSHLONES[B/W/D/Q] k1, r2. The mnemonics B/W/D/Q means that the instruction KSHLONES has four forms: KSHLONESB, KSHLONESW, KSHLONESD and KSHLONESQ, which correspond to masks of 8, 16, 32, 64 bits, respectively. In this example, the k1 mask serves as both a source operand and a destination. The other source operand is a general purpose register or a value from memory.

The KSHLONES instruction shifts bits of the k1 mask to the left by the number of times defined in the source operand (r2 or memory) and pulls in ones to fill the lower-order bit positions. The terms "shift left" or "left-shift" herein mean that the bits are shifted in the direction from the least significant bit (LSB) to the most significant bit (MSB). That is, each time the k1 mask is shifted to the left by one bit position, a bit value of one is pulled in to fill the least significant bit position. For example, if k1=1:0:0:0:1:1:0:0 and r2=4, then "KSHLONESB k1, r2" will produce a result k1=1:1:0:0:1:1:1:1, where each "0" and "1" represents a bit value. It is noted that those k1 bits remaining in the resulting (destination) k1 are merely shifted in position and their values are not altered by the shift. The new bits adding to the LSB positions are all ones.

FIG. 2B illustrates an alternative embodiment of a mask generating instruction SHLONES[B/W/D/Q] r1, r2, which uses a general purpose register r1 as both the source operand and the destination. This form of the instruction enables its usage as a complementary bit manipulation instruction. FIG. 2C illustrates another alternative embodiment of a mask generating instruction that modifies state flags (ZF,CF), such that the instruction can be used directly for control flow. Another embodiment of the mask generating instruction stores shifted result (i.e., the resulting mask) to a destination register different from the source operands; e.g., KSHLONES k1, k2, r2, and SHLONES r1, r2, r3. Additional alternative embodiments of the instructions may exist that do not necessarily have the same instruction formats as the mask generating instructions described above. In the following description, the various forms of the mask generating instructions are referred to as KSHLONES and its variants.

FIGS. 3A and 3B illustrate example scenarios in which KSHLONES and its variants may be used to improve efficiency of vector computation. In these examples, the remainder array elements in the remainder loop of a vector operation do not fill the entire vector register. In these elements, it is assumed that the vector register can store up to 16 array elements: e.g., the vector register has 512 bits and each array element is a 32-bit doubleword. If the total number of array elements is 35 and the beginning of the loop is aligned with the vector register (as shown in FIG. 3A), there will be three remainder array elements at the end that are not processed in the vectorized loop and need to be handled separately. If the total number of array elements is 35 and the beginning of the loop is not aligned with the vector register (two array elements in the first vectorized loop as shown in FIG. 3B), there will be one remainder array element at the end that is not processed in the vectorized loop and needs to be handled separately. The mask generating instruction described herein generates a mask that can be used with the remainder array elements in mask vector operations to improve loop vectorization.

To improve the efficiency of data access, a compiler can generate code to separately handle the remainder array elements in the last vectorized loop. However, the number of array elements in the last vectorized loop generally cannot be resolved at compile time, as the addresses of the array elements and/or loop trip-counts are not known at that time. With the embodiments described herein, at compile time the compiler can generate one or more of the mask generating instructions in lieu of other code sequences that perform the same tasks. Thus, a compiler can utilize these mask generating instructions to simplify its task of loop optimization. In alternative embodiments, the mask generating instructions can be used by a programmer or other code-generating entity.

The KSHLONES instruction and its variants can be used to handle the scenario where the total size of the remainder data elements at the very end of a loop is smaller than the width of the vector register. This means that the KSHLONES instruction and its variants can be used when there are not enough iterations in a loop (that is, not enough data elements in the array) to make up a full-width vector operation.

In the example of FIG. 3C, the last three data elements of the array (i.e., A(32), A(33), A(34)) do not occupy the full width of a source vector 307. That is, there are not enough elements left in A to fill the entire vector register. Since the source vector 307 contains A(32), A(33), A(34) as its lowest-order data elements, only the lowest-order three bits of a mask 308 are set (e.g., to 1) to indicate that the addition should be performed, and the results of the addition should be stored, for A(32), A(33), A(34). The higher-order 13 bits of the mask 308 are cleared (e.g., 0). The mask 308 can be the result generated by a processor executing the KSHLONES instruction or one of its variants.

In one embodiment, the lack of data elements at the end of an array (for filling an entire vector register) can be a result of initial misalignment at the base address of the array. For example, in image processing applications, often times the size of the image array is an integer multiple of the vector register width. However, if the beginning of the image array is misaligned, a number of data elements may be left at the end of the loop that cannot fill the entire vector register.

The use of the mask 308 helps vectorize the execution of a loop in which data elements of an array are operands. In the examples of FIG. 3C, the iteration index i=32, 33 and 34 can be vectorized with a masked vector operation in which the source vector 307 is used with the mask 308. In one embodiment, upon detecting a loop, a compiler can generate loop-optimizing code that includes one or more of the mask generating instructions described herein.

The instruction for the illustrated masked vector operation 303 indicates a source vector to be added to a scalar value. Other masked vector instructions may indicate two or more source vectors. The instruction of the masked vector operation 303 also specifies the mask 308. Each of the masks includes multiple mask elements, predicate elements, conditional control elements, or flags. As shown in the illustration, there may be one such mask element or flag for each corresponding source data element in the case of the operation involving one source vector operand. Commonly each element or flag may be a single bit. A single bit may allow specifying either of two different possibilities (e.g., perform the operation versus do not perform the operation, store a result of the operation versus do not store a result of the operation, etc.). Alternatively, if selecting between more than two different options is desired, then two or more bits may be used for each flag or element.

According to the illustrated convention, when a given mask bit is set to one, a result of the vector operation is performed on a corresponding data element of the source vector and stored in a corresponding data element of the result. Conversely, when the given mask bit is cleared to zero, then the vector operation is either omitted (i.e., not performed) for the corresponding data element of the source vector, or the result is not allowed to be stored in the corresponding data element of the result. Rather, another value may be stored in the result data element. For example, the numerical value of the corresponding data element from the source vector is stored. In an alternative embodiment, a zero or another predetermined value may be stored in the corresponding data element of the result. An opposite convention to that illustrated is also possible where bits are cleared (i.e., 0) to allow the results to be stored, or set (i.e., 1) to not allow the results to be stored.

The following example code sequence generates a mask for a remainder loop, with current iteration count stored in rbx and loop limit in rcx. Using the illustrated embodiment of FIG. 3C, the current iteration count is 31 and the loop limit is 34.

SUB rbx, rcx //calculate number of remaining iterations
    KXOR k1, k1, k1 //zeroing mask
    KSHLONES k1, rbx //generate mask for remainder loop There are many advantages of using the KSHLONES instruction (including its variants) for generating a mask for a remainder loop. The KSHLONES instructions operate with a subtraction result. For another instruction that includes the subtraction as part of its operation, additional pre-computation overhead would be incurred for performing operand type comparison prior to the subtraction. Further, the KSHLONES instructions cover scenarios in which iteration counter and/or loop limit can be negative, which allow more variability for the compiler to optimize the code. Additionally, the code for generating a mask for a remainder loop is split into three phases (i.e., the three instructions in the above code sequence), which improves execution scheduling and provides more variability and flexibility in the use of the KSHLONES instructions. The KSHLONES instructions can be used by itself or in combination with other instructions where subtraction of operands is not needed. For example, when the number (N) of ones is known, KSHLONES can be used to generate a mask with ones in the N least significant bits as follows: N=5; k1=0:0:0:0:0:0:0:0; KSHLONES k1, N results in k1=0:0:0:1:1:1:1:1.

Figure 4:
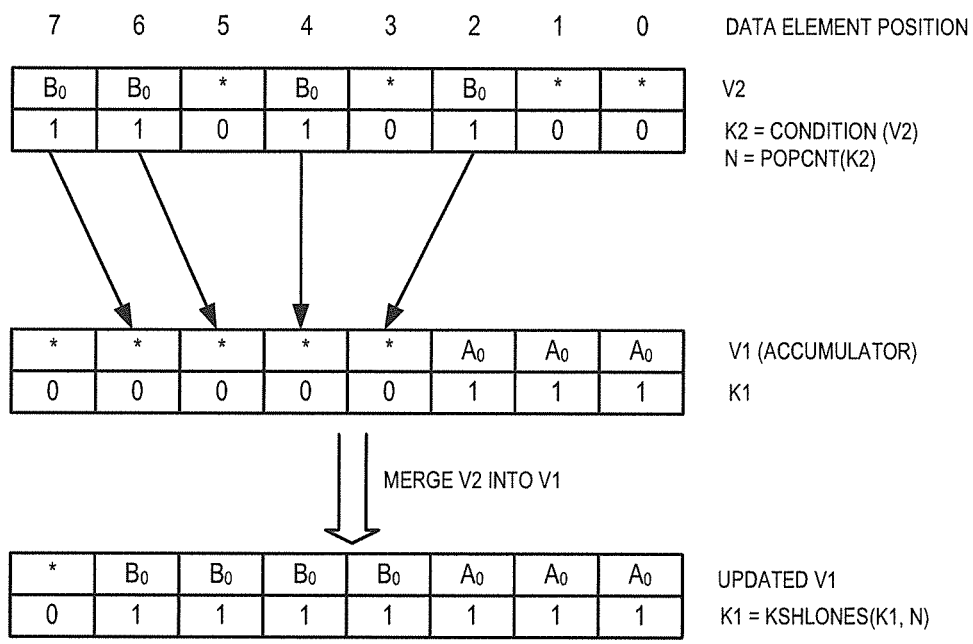
FIG. 4 illustrates the number of mask bits for a given vector register width and data element width according to one embodiment.

The KSHLONES instructions can also be used in data accumulation for sparse vector computation, as shown in the example of FIG. 4. In this example, a pair of vector registers (V1 and V2) and a pair of mask registers (K1 and K2) are utilized to perform data accumulation. Both V1 and V2 are sparse vectors in which not all of the data element positions are filled. V1 serves as an accumulator to accumulate vector elements for computation, and V2 provides new data elements to fill in the unutilized slots in V1. The mask registers K1 and K2 are used to indicate which positions in the corresponding vector registers contain valid data elements for computation. In this example the mask bits corresponding to the valid data elements are set to one for both K1 and K2. It is understood that the bit values of K2 can be reversed for the same data elements of V2.

In the example of FIG. 4, V2 initially contains four elements indicated as $B_0$. The corresponding mask bits in K2 indicate the positions of these four elements. By using N=POPCNT(K2), the value of N is set to the number of K2 bits having the value of one. Thus in this example, N=4. The mask bits in K1 contain three ones corresponding to element positions 0-2 of the initial V1. The information contained in K1 indicates not only the number of accumulated elements $A_0$, but also the right boundary of empty slots inside V1 (in this example the right boundary is at the third element position). K1 can be used as-is or inverted for further data accumulation that includes COMPRESS and/or EXPAND instructions.

The four $B_0$'s can be compressed and merged into element positions of 3-6 of V1, using existing vector instructions. The updated V1 becomes denser than the initial V1, and therefore is more amenable to efficient vector computation. The corresponding K1 after the merge can be computed by K1=KSHLONES(K1, N), which preserves the initial three bits of one in the source value of K1 and adds four additional bits of one. Preserving the source value of K1 removes the need for keeping separate counters for tracking the number of elements inside the accumulator before and after the merge. After the updated V1 is used in a vector computation, the operations of FIG. 4 can be repeated such that the accumulator can keep accumulating date elements for vector computation.

The mask generating instructions disclosed herein are general-purpose instructions that have general uses. For example, these instructions may be used, either alone or in combination with other instructions, to calculate a mask for a remainder loop of vector operations or for data accumulation in sparse vector computation. Other uses are also contemplated based on the present disclosure.

Figure 5:
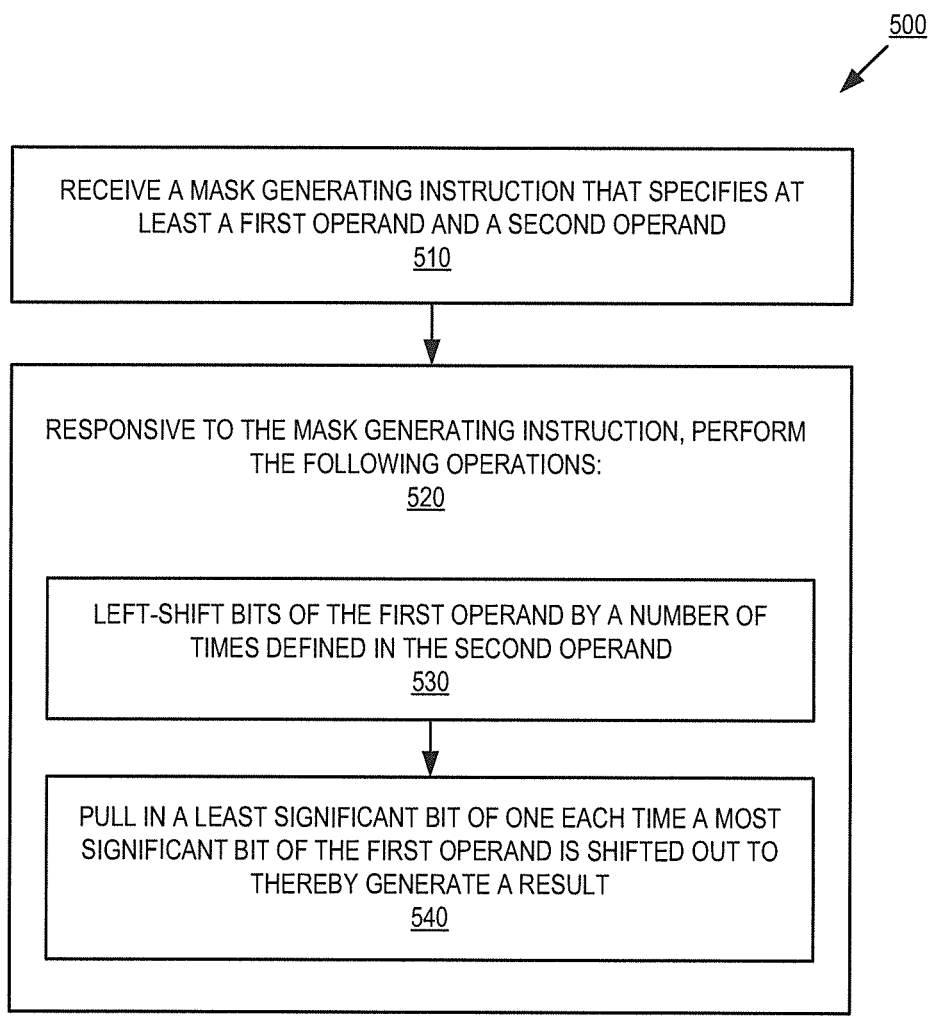
FIG. 5 is a flow diagram illustrating operations to be performed responsive to a mask generating instruction according to one embodiment.

FIG. 5 is a block flow diagram of a method 500 for executing a mask generating instruction according to one embodiment. The method 500 begins with a processor (more specifically, e.g., the execution unit 140 of FIG. 1) receiving a mask generating instruction that specifies at least a first operand and a second operand (block 510). Examples of the mask generating instructions include the KSHLONES instruction and its variants as described above. In one embodiment, the first operand is a mask register and the second operand is a general purpose register. In an alternative embodiment, the first operand and the second operand are both general purpose registers. Response to the mask generating instruction, the processor performs the following operations (block 520): left-shifting bits of the first operand by a number of times defined in the second operand (block 530), and pulling in a least significant bit of one each time a most significant bit of the first operand is shifted out (to the left) to thereby generate a result to thereby generate a result (block 540). Each bit in the result corresponds to a data element. The result is a mask to be used in a masked vector operation.

In various embodiments, the method 500 may be performed by a general-purpose processor, a special-purpose processor (e.g., a graphics processor or a digital signal processor), or another type of digital logic device or instruction processing apparatus. In some embodiments, the method 500 may be performed by the instruction processing apparatus 115 of FIG. 1, or a similar processor, apparatus, or system, such as the embodiments shown in FIGS. 7-13. Moreover, the instruction processing apparatus 115 of FIG. 1, as well as the processor, apparatus, or system shown in FIGS. 7-13 may perform embodiments of operations and methods either the same as, similar to, or different than those of the method 500.

In some embodiments, the instruction processing apparatus 115 of FIG. 1 may operate in conjunction with an instruction converter that converts an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 6:
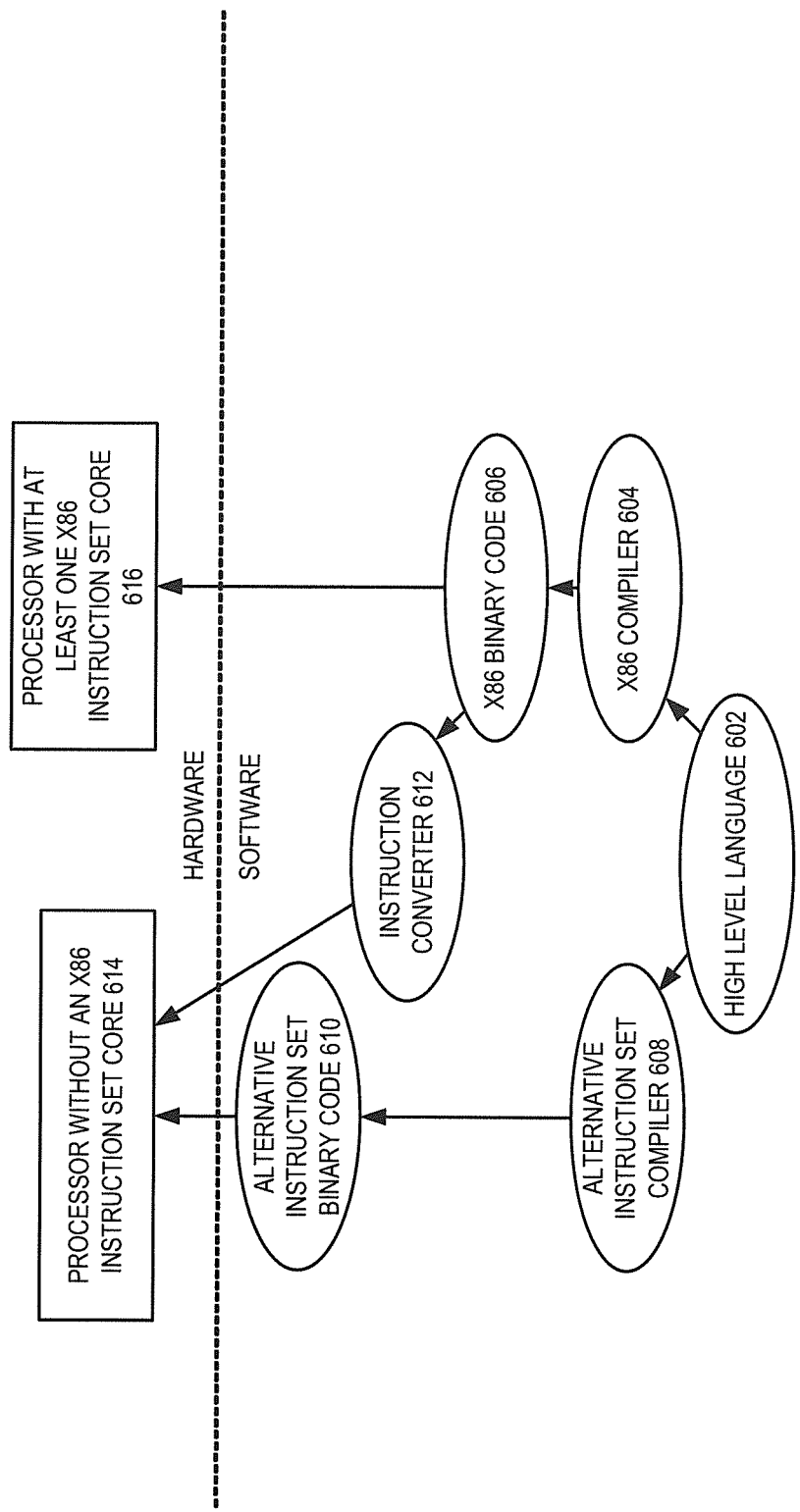
FIG. 6 is a block diagram illustrating the use of a software instruction converter to convert binary instructions in a source instruction set to binary instructions in a target instruction set according to one embodiment.

FIG. 6 is a block diagram contrasting the use of a software instruction converter according to embodiments of the invention. In the illustrated embodiment, the instruction converter is a software instruction converter, although alternatively the instruction converter may be implemented in software, firmware, hardware, or various combinations thereof. FIG. 6 shows a program in a high level language 602 may be compiled using an x86 compiler 604 to generate x86 binary code 606 that may be natively executed by a processor with at least one x86 instruction set core 616. The processor with at least one x86 instruction set core 616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 604 represents a compiler that is operable to generate x86 binary code 606 (e.g., object code) that can, with or without additional linkage processing, be executed on the processor with at least one x86 instruction set core 616. Similarly, FIG. 6 shows the program in the high level language 602 may be compiled using an alternative instruction set compiler 608 to generate alternative instruction set binary code 610 that may be natively executed by a processor without at least one x86 instruction set core 614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 612 is used to convert the x86 binary code 606 into code that may be natively executed by the processor without an x86 instruction set core 614. This converted code is not likely to be the same as the alternative instruction set binary code 610 because an instruction converter capable of this is difficult to make; however, the converted code will accomplish the general operation and be made up of instructions from the alternative instruction set. Thus, the instruction converter 612 represents software, firmware, hardware, or a combination thereof that, through emulation, simulation or any other process, allows a processor or other electronic device that does not have an x86 instruction set processor or core to execute the x86 binary code 606.

Exemplary Core Architectures

In-Order and Out-of-Order Core Block Diagram

FIG. 7A is a block diagram illustrating both an exemplary in-order pipeline and an exemplary register renaming, out-of-order issue/execution pipeline according to embodiments of the invention. FIG. 7B is a block diagram illustrating both an exemplary embodiment of an in-order architecture core and an exemplary register renaming, out-of-order issue/execution architecture core to be included in a processor according to embodiments of the invention. The solid lined boxes in FIGS. 7A and 7B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

FIG. 7B shows processor core 790 including a front end unit 730 coupled to an execution engine unit 750, and both are coupled to a memory unit 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode unit 740 or otherwise within the front end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 758 comprises a vector registers unit, a write mask registers unit, and a scalar registers unit. These register units may provide architectural vector registers, vector mask registers, and general purpose registers. The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels of cache and eventually to a main memory.

By way of example, the exemplary register renaming, out-of-order issue/execution core architecture may implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 790 includes logic to support a packed data instruction set extension (e.g., SSE, AVX1, AVX2, etc.), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 734/774 and a shared L2 cache unit 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 8B:
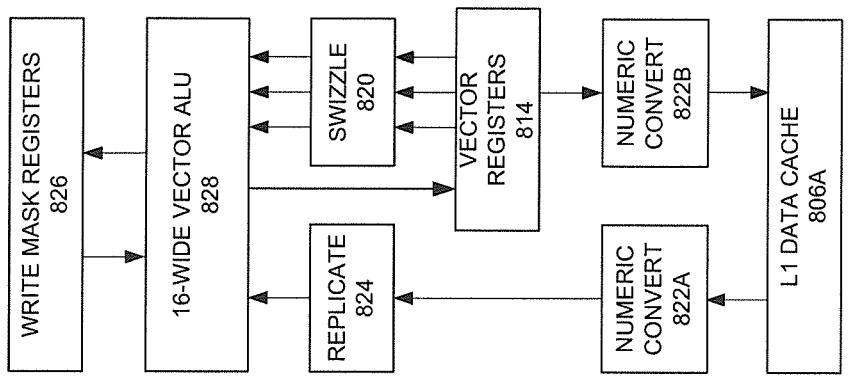
FIGS. 8A-B are block diagrams of a more specific exemplary in-order core architecture according to one embodiment.
Figure 8A:
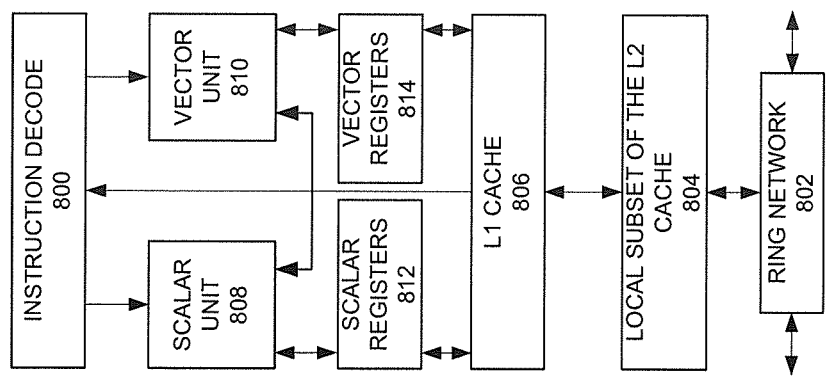

FIGS. 8A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 8A is a block diagram of a single processor core, along with its connection to the on-die interconnect network 802 and with its local subset of the Level 2 (L2) cache 804, according to embodiments of the invention. In one embodiment, an instruction decoder 800 supports the x86 instruction set with a packed data instruction set extension. An L1 cache 806 allows low-latency accesses to cache memory into the scalar and vector units. While in one embodiment (to simplify the design), a scalar unit 808 and a vector unit 810 use separate register sets (respectively, scalar registers 812 and vector registers 814) and data transferred between them is written to memory and then read back in from a level 1 (L1) cache 806, alternative embodiments of the invention may use a different approach (e.g., use a single register set or include a communication path that allow data to be transferred between the two register files without being written and read back).

The local subset of the L2 cache 804 is part of a global L2 cache that is divided into separate local subsets, one per processor core. Each processor core has a direct access path to its own local subset of the L2 cache 804. Data read by a processor core is stored in its L2 cache subset 804 and can be accessed quickly, in parallel with other processor cores accessing their own local L2 cache subsets. Data written by a processor core is stored in its own L2 cache subset 804 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 8B is an expanded view of part of the processor core in FIG. 8A according to embodiments of the invention. FIG. 8B includes an L1 data cache 806A part of the L1 cache 804, as well as more detail regarding the vector unit 810 and the vector registers 814. Specifically, the vector unit 810 is a 16-wide vector processing unit (VPU) (see the 16-wide ALU 828), which executes one or more of integer, single-precision float, and double-precision float instructions. The VPU supports swizzling the register inputs with swizzle unit 820, numeric conversion with numeric convert units 822A-B, and replication with replication unit 824 on the memory input. Write mask registers 826 allow predicating resulting vector writes.

Processor with Integrated Memory Controller and Graphics

Figure 9:
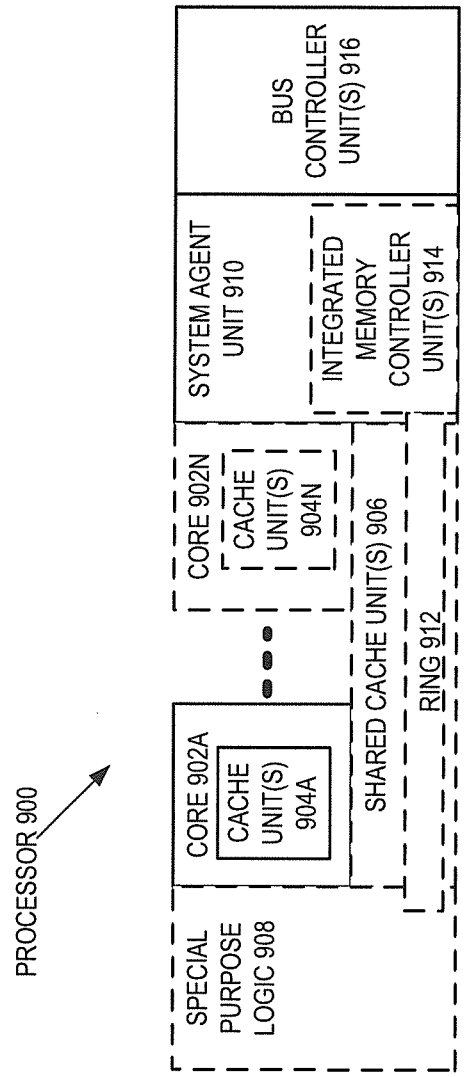
FIG. 9 is a block diagram of a processor according to one embodiment.

FIG. 9 is a block diagram of a processor 900 that may have more than one core, may have an integrated memory controller, and may have integrated graphics according to embodiments of the invention. The solid lined boxes in FIG. 9 illustrate a processor 900 with a single core 902A, a system agent 910, a set of one or more bus controller units 916, while the optional addition of the dashed lined boxes illustrates an alternative processor 900 with multiple cores 902A-N, a set of one or more integrated memory controller unit(s) 914 in the system agent unit 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof. While in one embodiment a ring based interconnect unit 912 interconnects the integrated graphics logic 908, the set of shared cache units 906, and the system agent unit 910/integrated memory controller unit(s) 914, alternative embodiments may use any number of well-known techniques for interconnecting such units. In one embodiment, coherency is maintained between one or more cache units 906 and cores 902-A-N.

In some embodiments, one or more of the cores 902A-N are capable of multi-threading. The system agent 910 includes those components coordinating and operating cores 902A-N. The system agent unit 910 may include for example a power control unit (PCU) and a display unit. The PCU may be or include logic and components needed for regulating the power state of the cores 902A-N and the integrated graphics logic 908. The display unit is for driving one or more externally connected displays.

The cores 902A-N may be homogenous or heterogeneous in terms of architecture instruction set; that is, two or more of the cores 902A-N may be capable of execution the same instruction set, while others may be capable of executing only a subset of that instruction set or a different instruction set.

Exemplary Computer Architectures

FIGS. 10-13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 10:
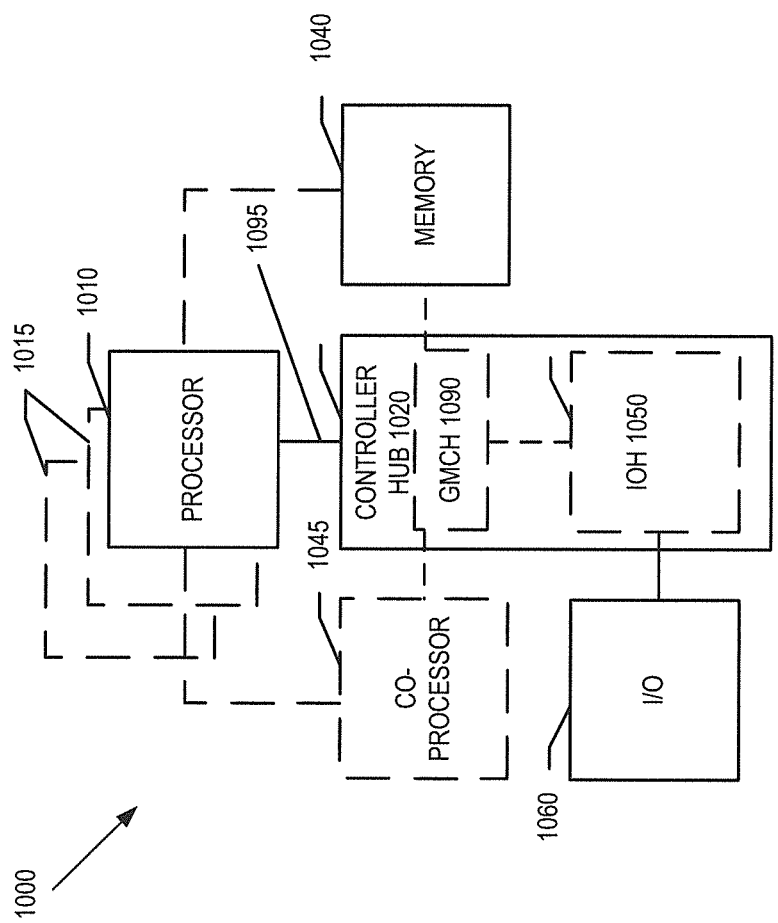
FIG. 10 is a block diagram of a system in accordance with one embodiment.

Referring now to FIG. 10, shown is a block diagram of a system 1000 in accordance with one embodiment of the present invention. The system 1000 may include one or more processors 1010, 1015, which are coupled to a controller hub 1020. In one embodiment the controller hub 1020 includes a graphics memory controller hub (GMCH) 1090 and an Input/Output Hub (IOH) 1050 (which may be on separate chips); the GMCH 1090 includes memory and graphics controllers to which are coupled memory 1040 and a coprocessor 1045; the IOH 1050 is couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 in a single chip with the IOH 1050.

The optional nature of additional processors 1015 is denoted in FIG. 10 with broken lines. Each processor 1010, 1015 may include one or more of the processor cores described herein and may be some version of the processor 900.

The memory 1040 may be, for example, dynamic random access memory (DRAM), phase change memory (PCM), or a combination of the two. For at least one embodiment, the controller hub 1020 communicates with the processor(s) 1010, 1015 via a multi-drop bus, such as a frontside bus (FSB), point-to-point interface such as QuickPath Interconnect (QPI), or similar connection 1095.

In one embodiment, the coprocessor 1045 is a special-purpose processor, such as, for example, a high-throughput MIC processor, a network or communication processor, compression engine, graphics processor, GPGPU, embedded processor, or the like. In one embodiment, controller hub 1020 may include an integrated graphics accelerator.

There can be a variety of differences between the physical resources 1010, 1015 in terms of a spectrum of metrics of merit including architectural, micro-architectural, thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

Figure 11:
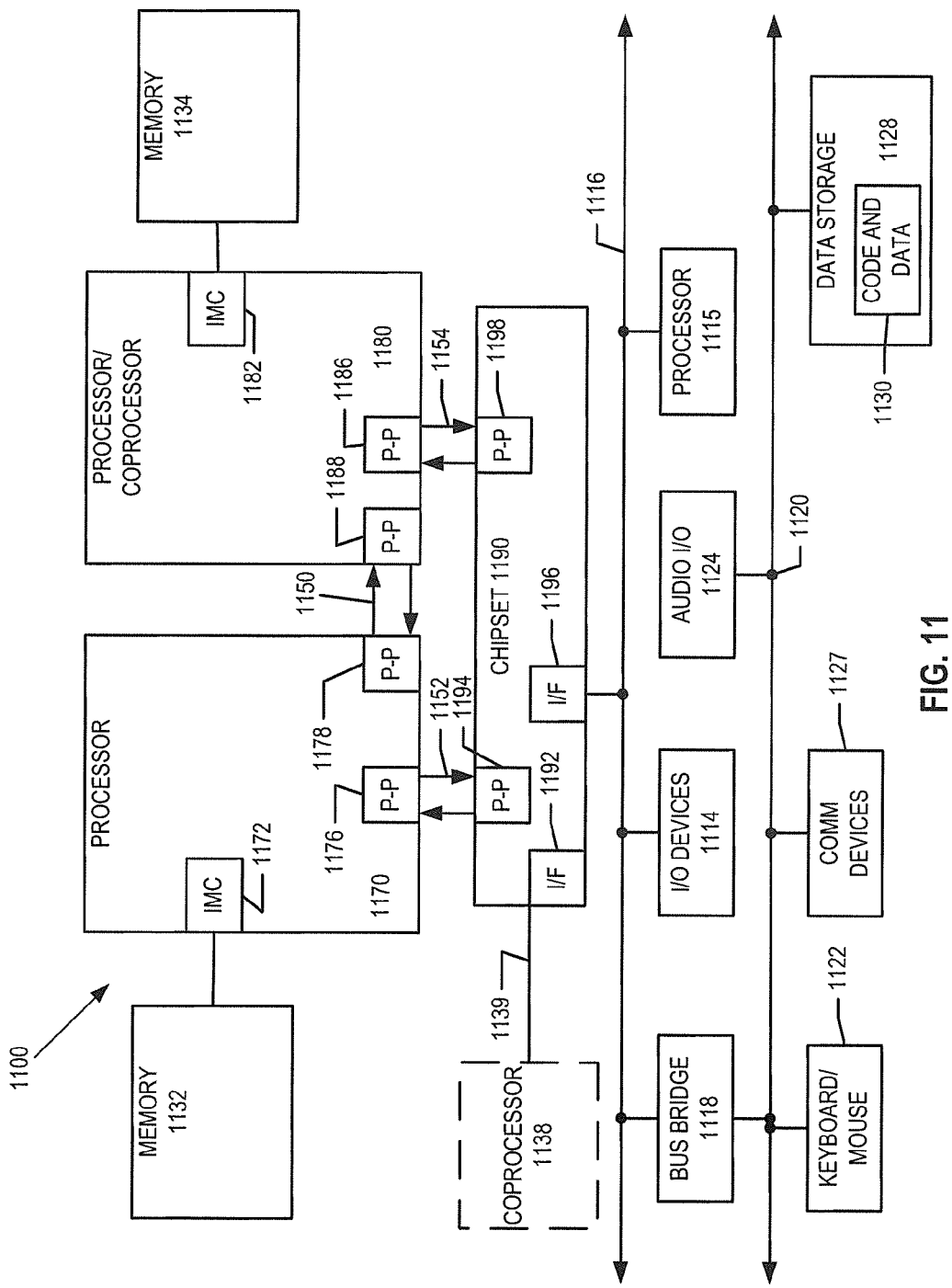
FIG. 11 is a block diagram of a second system in accordance with one embodiment.

Referring now to FIG. 11, shown is a block diagram of a first more specific exemplary system 1100 in accordance with an embodiment of the present invention. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 900. In one embodiment of the invention, processors 1170 and 1180 are respectively processors 1010 and 1015, while coprocessor 1138 is coprocessor 1045. In another embodiment, processors 1170 and 1180 are respectively processor 1010 coprocessor 1045.

Processors 1170 and 1180 are shown including integrated memory controller (IMC) units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1139. In one embodiment, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) units), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to the second bus 1120. Note that other architectures are possible. For example, instead of the point-to-point architecture of FIG. 11, a system may implement a multi-drop bus or other such architecture.

Figure 12:
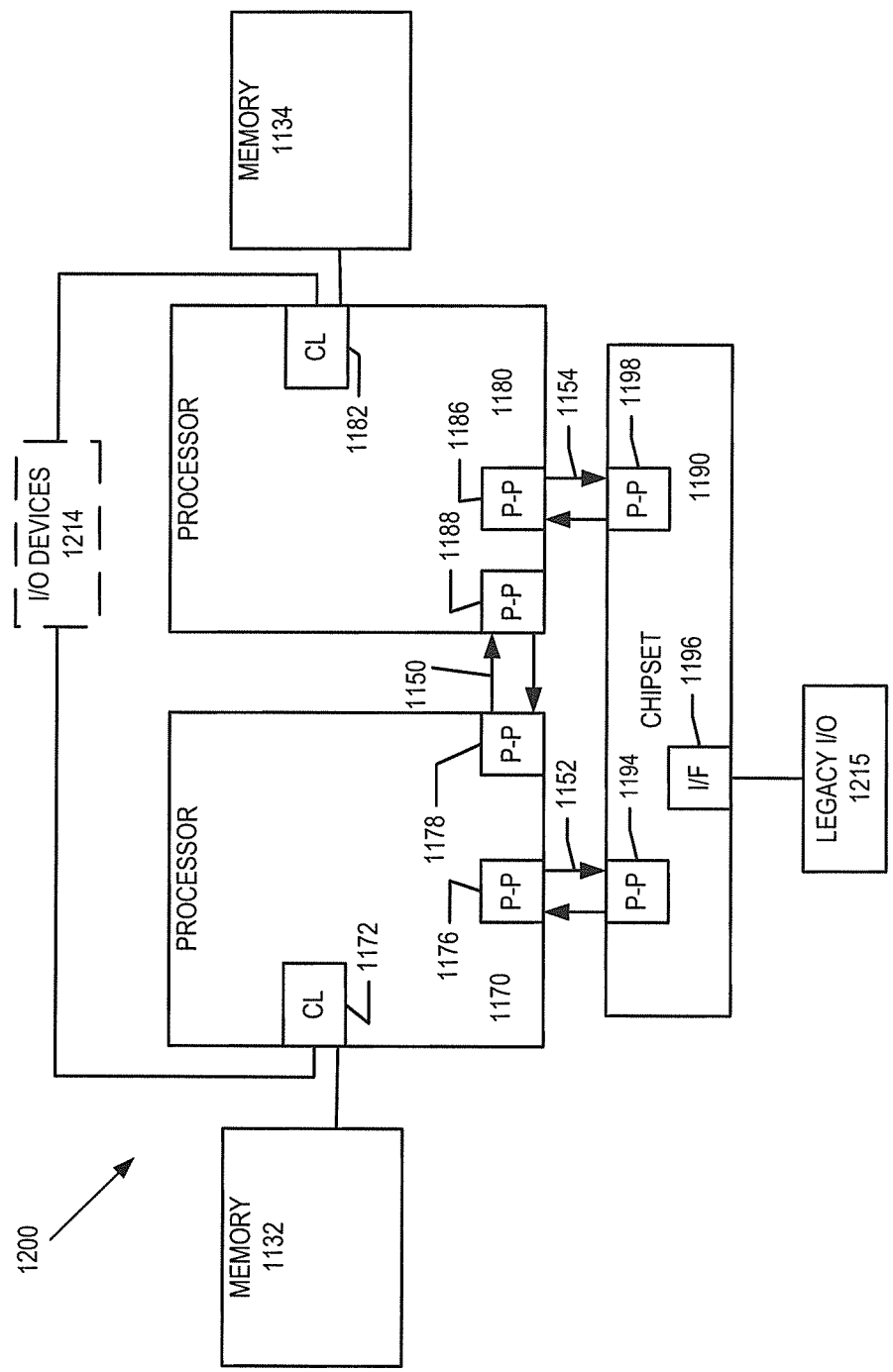
FIG. 12 is a block diagram of a third system in accordance with an embodiment of the invention.

Referring now to FIG. 12, shown is a block diagram of a second more specific exemplary system 1200 in accordance with an embodiment of the present invention. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1172 and 1182, respectively. Thus, the CL 1172, 1182 include integrated memory controller units and include I/O control logic. FIG. 12 illustrates that not only are the memories 1132, 1134 coupled to the CL 1172, 1182, but also that I/O devices 1214 are also coupled to the control logic 1172, 1182. Legacy I/O devices 1215 are coupled to the chipset 1190.

Figure 13:
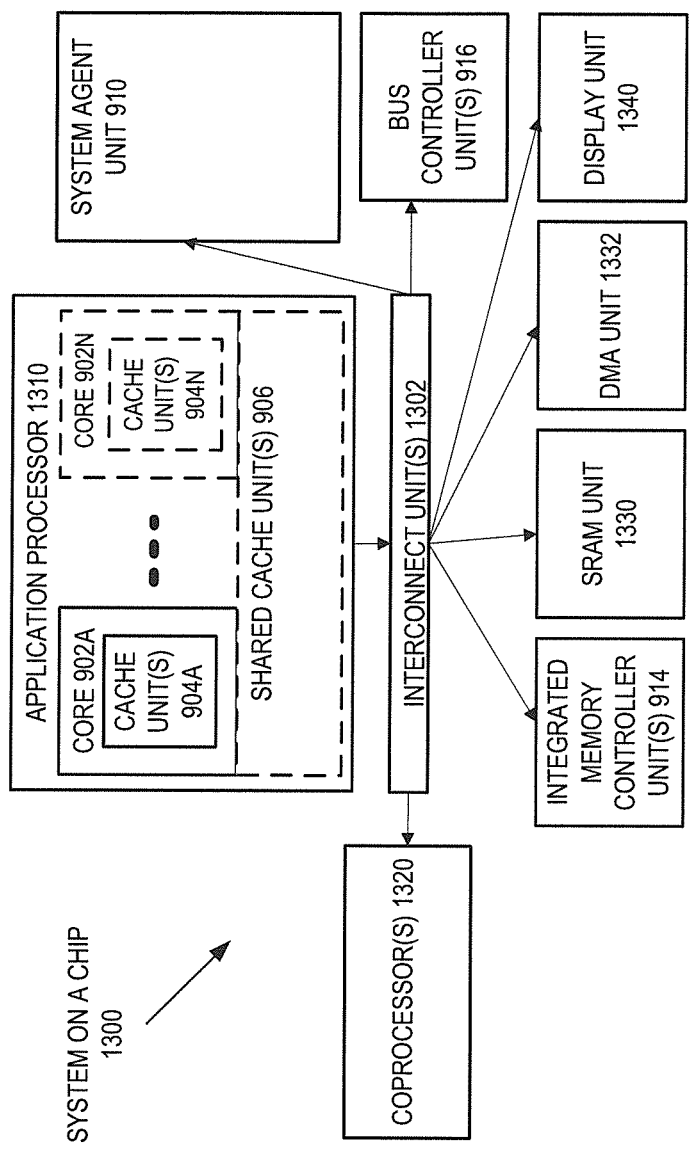
FIG. 13 is a block diagram of a system-on-a-chip (SoC) in accordance with one embodiment.

Referring now to FIG. 13, shown is a block diagram of a SoC 1300 in accordance with an embodiment of the present invention. Similar elements in FIG. 9 bear like reference numerals. Also, dashed lined boxes are optional features on more advanced SoCs. In FIG. 13, an interconnect unit(s) 1302 is coupled to: an application processor 1310 which includes a set of one or more cores 202A-N and shared cache unit(s) 906; a system agent unit 910; a bus controller unit(s) 916; an integrated memory controller unit(s) 914; a set or one or more coprocessors 1320 which may include integrated graphics logic, an image processor, an audio processor, and a video processor; an static random access memory (SRAM) unit 1330; a direct memory access (DMA) unit 1332; and a display unit 1340 for coupling to one or more external displays. In one embodiment, the coprocessor(s) 1320 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
a plurality of vector registers, one of which stores data elements of an array; and
execution circuitry coupled to the plurality of vector registers, the execution circuitry to:
receive a mask generating instruction that specifies at least a first operand and a second operand, and
responsive to the mask generating instruction, left-shift bits of the first operand by a number of times defined in the second operand, and pull in a least significant bit of one each time a most significant bit of the first operand is shifted out to thereby generate a result containing a plurality of bits, wherein each bit in the result corresponds to one of the data elements of the array.

2. The apparatus of claim 1, wherein the second operand specifies a number of remaining iterations in a remainder loop of a vector operation.

3. The apparatus of claim 2, wherein the second operand specifies a subtraction result of a loop limit minus a current iteration count for the vector operation.

4. The apparatus of claim 1, wherein the plurality of vector registers include a first vector register and a second vector register, and wherein the second operand specifies a number of data elements in the second vector register to be merged into existing data elements in the first vector register for vector computation.

5. The apparatus of claim 1, wherein both the first operand and the second operand are general purpose registers.

6. The apparatus of claim 1, wherein the first operand is mask register and the second operand is general purpose register.

7. The apparatus of claim 1, wherein one or more state registers are set based on the result.

8. A method comprising:
receiving, by a processor, a mask generating instruction that specifies at least a first operand and a second operand; and
responsive to the mask generating instruction, performing the following operations:
left-shifting bits of the first operand by a number of times defined in the second operand, and
pulling in a least significant bit of one each time a most significant bit of the first operand is shifted out to thereby generate a result containing a plurality of bits, each bit in the result corresponding to a data element of an array.

9. The method of claim 7, wherein the second operand specifies a number of remaining iterations in a remainder loop of a vector operation.

10. The method of claim 9, wherein the second operand specifies a subtraction result of a loop limit minus a current iteration count for the vector operation.

11. The method of claim 7, wherein the second operand specifies a number of data elements in a second vector register to be merged into existing data elements in a first vector register for vector computation.

12. The method of claim 7, wherein both the first operand and the second operand are general purpose registers.

13. The method of claim 7, wherein the first operand is mask register and the second operand is general purpose register.

14. The method of claim 7, further comprising:
modifying one or more state registers based on the result.

15. A system comprising:
random access memory; and
a processor coupled to the random access memory, the processor comprising:
a plurality of vector registers, one of which stores data elements of an array; and
execution circuitry coupled to the plurality of vector registers, the execution circuitry to:
receive a mask generating instruction that specifies at least a first operand and a second operand, and
responsive to the mask generating instruction, left-shift bits of the first operand by a number of times defined in the second operand, and pull in a least significant bit of one each time a most significant bit of the first operand is shifted out to thereby generate a result containing a plurality of bits, wherein each bit in the result corresponds to one of the data elements of the array.

16. The system of claim 15, wherein the second operand specifies a number of remaining iterations in a remainder loop of a vector operation.

17. The system of claim 15, wherein the plurality of vector registers include a first vector register and a second vector register, and wherein the second operand specifies a number of data elements in the second vector register to be merged into existing data elements in the first vector register for vector computation.

18. The system of claim 15, wherein both the first operand and the second operand are general purpose registers.

19. The system of claim 15, wherein the first operand is mask register and the second operand is general purpose register.

20. The system of claim 15, wherein one or more state registers are set based on the result.

* * * * *